United States Patent Office
2,831,590
Patented Apr. 22, 1958

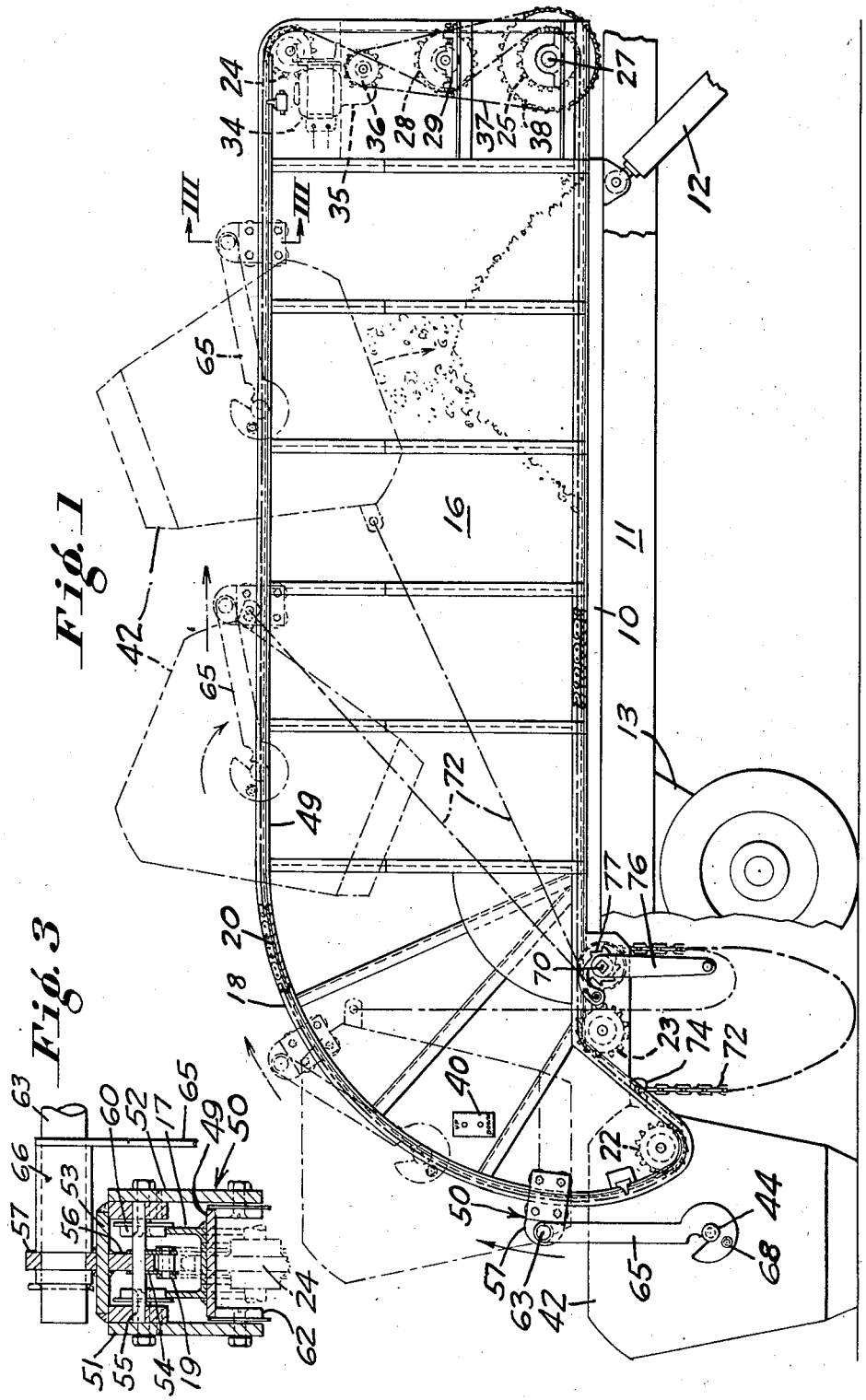

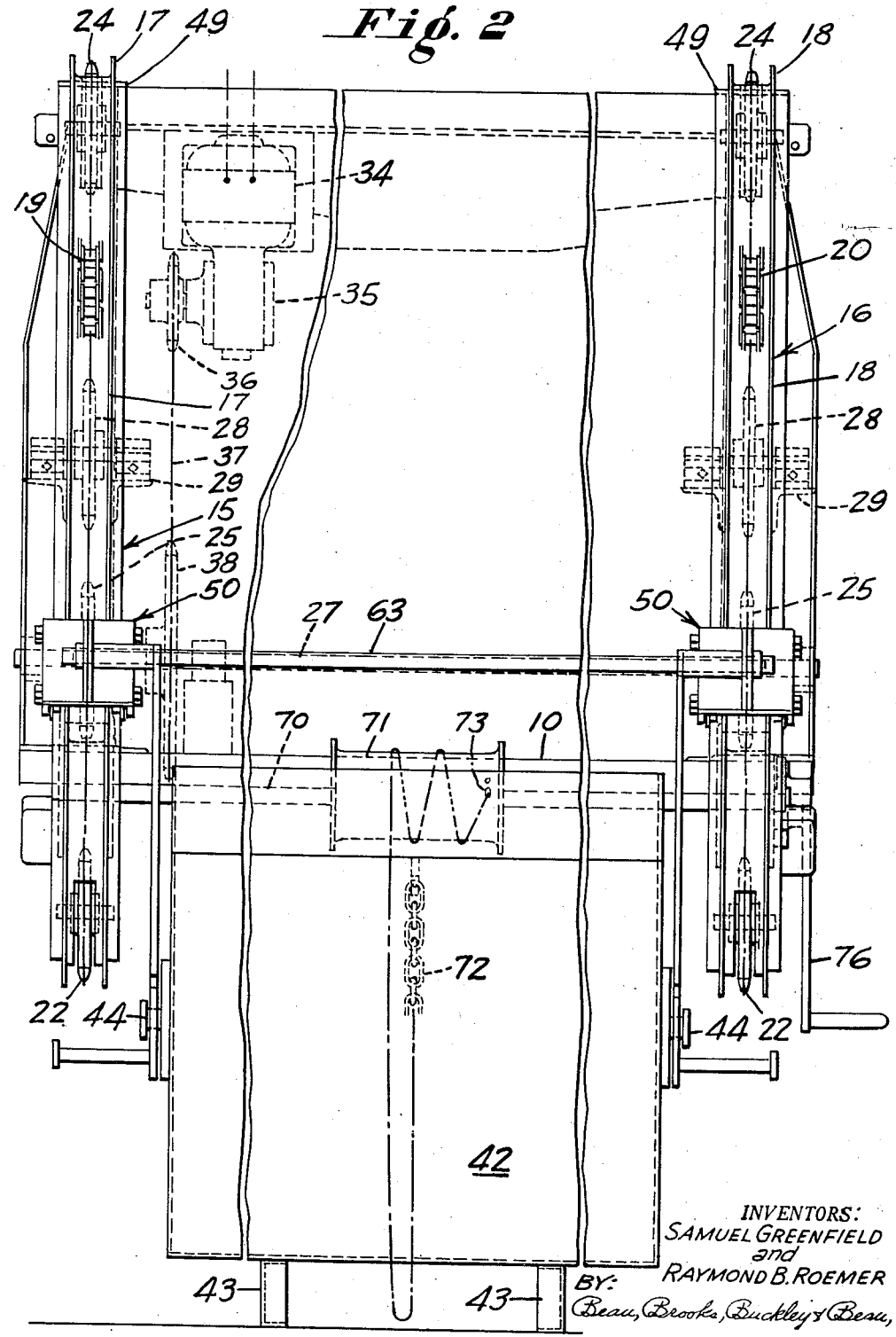

2,831,590
LOADING APPARATUS FOR VEHICLES
Samuel Greenfield and Raymond B. Roemer, Buffalo, N. Y.

Application March 29, 1955, Serial No. 497,666
16 Claims. (Cl. 214—302)

This invention relates to a loading apparatus for trucks and the like, including a receptacle for receiving material and apparatus for engaging and lifting the same and dumping the contents thereof into the vehicle body or, when desired, merely placing the receptacle itself in the vehicle or truck body.

One common form of material collecting and moving apparatus in common use at the present time comprises a relatively large special receptacle which is placed at a point of collection of material and filled with material and then picked up by a truck and hauled, still filled with the material, to a remote point of unloading.

An obvious disadvantage of apparatus of this type resides in the fact that the receptacle which is used to collect and contain the material at the point of loading is removed with the load and must ultimately be returned to the collecting point or some other collecting point before it can be placed back in use as a collecting receptacle.

Also, the receptacles in this type of apparatus are very large, relatively speaking, since each receptacle represents an entire truck load of material. Furthermore, the arrangement of apparatus of this class is such that only a single collecting receptacle is hauled by the truck at one time and accordingly the hauling capacity of the truck is definitely limited to the contents of a single collecting receptacle.

While the apparatus of the present invention may be used wherever its advantages may be gainfully employed, it is believed that its greatest immediate field of use is in applications where material such as scrap metal and the like is accumulated at a given place, such as a factory, and the problem is to gather that waste or scrap material along with other like material from other points of origin, for transportation to a point of reprocessing or other utilization or disposition of the material.

In applications similar to that just described, the arrangement of the present invention is such that each point of collection or accumulation of material may be provided with one or more collecting receptacles which are always at the point of accumulation and need not be hauled therefrom and replaced by other receptacles.

The loading apparatus of the present invention is adapted to pick up the receptacles when they become loaded at a point of accumulation, to immediately dump the contents of each receptacle into the truck body, and to then replace the receptacle for immediate re-use, while the truck body may then receive further receptacle contents either at the same point or another point of accumulation, until the full capacity of the truck body is utilized in hauling such collected material to a point of reprocessing or other utilization of disposition.

In the case of the prior art apparatus referred to above, where the receptacles are hauled away by the truck, the hauling capacity of the truck is severely limited by the fact that only a single receptacle is hauled by the truck at one time and the actual hauling capacity of the truck is limited to the receiving capacity of a single collecting receptacle.

In other prior art apparatus collecting receptacles are directly and permanently associated with truck bodies, as in garbage collection apparatus. Such apparatus differs from that of the present invention both in the general construction and in its functional capabilities, all as will appear more clearly from a consideration of the following specification.

Considerations of economy are highly critical in many of the fields in which the apparatus of the present invention is intended to be employed, such for instance as the collection of scrap metal and other materials. For this reason the individual collecting receptacle must be of substantial capacity to avoid undue handling at the point of collection and, more importantly, to provide receptacles of such capacity that not too great a number are required to load a truck with the material.

Since these receptacles must thus be of substantial capacity and since the material collected is often of great weight, such as in the case of scrap metal, the handling and lifting of the receptacles for dumping into the truck body presents very peculiar problems which are met by the design and construction of the loading apparatus of the present invention in a highly novel and efficacious manner, as will appear from a consideration of the form of the invention set forth herein by way of example. Also, a considerable degree of versatility is required so that the apparatus may readily be adapted to or employed in the accomplishment of various hauling tasks.

Other objects and advantages of the apparatus of the present invention will appear to those skilled in the present art from a consideration of the following specification and the accompanying drawings which set forth by way of example an embodiment of the principles of the present invention. However, it is to be understood that the form thus set forth by way of example is not intended to limit the scope of the present invention, the underlying principles of which are defined in the appended claims.

In the drawings:

Fig. 1 is a general side elevational view of the body portion of a motor truck of the dump type constructed in accordance with one form of the present invention;

Fig. 2 is a rear end elevational view of the apparatus of Fig. 1;

Fig. 3 is a cross-sectional view taken generally on the line III—III of Fig. 1.

Throughout the several figures of the drawings like characters of reference denote like parts and, referring particularly to Fig. 1, the numeral 10 designates a truck platform mounted upon a frame or chassis 11, the truck body in the present instance being of the dump variety wherein a hydraulic cylinder 12 or similar means is provided for raising the front portion of the platform 10 around a rear pivot (not shown) to dump the contents of the truck rearwardly. The numeral 13 designates the rear wheel suspension.

A substantial element of the novelty of the present invention resides in the manner in which the elevating and conveying mechanism for the material receptacles is associated with and incorporated in the truck body. In the illustrative instance the truck body includes side wall structures designated generally 15 and 16 which extend vertically upwardly along the opposite side margins of platform 10 and are arranged to give tracking support to conveyor-chain means adaptable for elevating and moving material receptacles in a manner which will presently appear.

The side wall structures may, in the general form common to this art, comprise sheet metal panels connected and reinforced by various structural angles and channels, as generally indicated in Fig. 1. Since the main structural modifications of a truck body to adapt it to the purposes of the present invention affect the side wall structures, these side wall structures may be made as separate units to be installed upon the platforms of existing truck structures, as desired.

Each of the side walls 15 and 16 is provided entirely about its marginal periphery with channel formations, designated 17 and 18 respectively, each of which is arranged for guiding engagement with an endless chain device, the endless chains of the side walls 15 and 16 being designated 19 and 20, respectively.

A description of side wall 16 and its channel formation 18 and chain member 20 will suffice for both side walls since the construction of the two walls in this respect is the same. Referring to Fig. 1, the numerals 22, 23, 24 and 25 designate sprocket members which guide the endless chain 20 of side wall 16 about the corners of side wall 16, chain 20 deriving its guiding support, apart from the sprocket members, by riding in the channel formation 18 which extends about the side wall 16.

All of the foregoing sprockets are idler sprockets which are merely journaled for free rotation in the side wall structure with the exception of sprocket 25 which is a driving sprocket and is one of a pair of such driving sprockets fixed to the opposite ends of a drive shaft 27 which extends transversely of the forward portion of the truck body. A takeup sprocket 28 for chain 20 is likewise mounted at the front portion of the truck body and is provided with horizontal adjusting means 29 as shown in Fig. 1.

As shown in Fig. 1, a reversible electric driving motor 34 and a speed reducer 35 are provided for driving the endless chains 19 and 20. The output shaft of speed reducer 35 is provided with a sprocket 36 which is connected by means of a chain 37 with a companion sprocket 38 which is fixed to drive shaft 27.

The control buttons for selectively energizing motor 34 in opposite directions to control movements of the endless chains are preferably located at the rear of the truck body for convenient access in operating the loading apparatus, as at 40 in Fig. 1. The motor 34 will generally most conveniently be energized by connection with the storage battery of the truck although any other convenient means of energization may be availed of.

As indicated earlier herein, a primary object of the present invention is to provide loading apparatus for cooperation with receptacles which are normally left at various collecting points so that the contents of a succession of such receptacles may conveniently be collected in one or more truck loads without hauling the receptacles from the collection points but by merely dumping their contents successively into the truck body.

A typical receptacle is designated 42 in Figs. 1 and 2 and comprises a receptacle of approximately the width of the interior of the truck body, but adapted to fit readily between the side walls thereof, and is preferably of substantially uniform cross-section along its width, thus permitting uniform and efficient loading of the truck from side to side. In the present instance the receptacle 42 is provided with support rails 43 so disposed as to permit ready engagement with a fork-lift truck. Thus receptacles may be brought from collection points within a plant, for instance, to a common truck loading point.

Each receptacle 42 is provided at its opposite sides with outwardly projecting trunnions 44 which in the present instance are headed and arranged to cooperate with lifting devices in a manner which will presently appear.

The devices for engaging and lifting and moving the receptacles 42, or other article or material supports which may be used with the loading apparatus, are associated with the chains 19 and 20 by trolley devices which are fixed to the chains for longitudinal movement therewith and one of these trolley devices will now be described, with particular reference to Fig. 3. The trolley device there shown is the one which is attached to and travels with the left-hand chain 19 as viewed in Fig. 2.

The channel member 17 which is associated with side wall 15 is shown in cross-section in Fig. 3 and has fixed thereto an underlying plate 49 which extends generally from the upper front corner of each side wall rearwardly and thence downwardly to the general vicinity of sprocket 22. The channel 17 and plate 50 are fixed with respect to their associated side wall 15 in any desired manner and cooperate to support and guide trolley means connected to chain 19.

Each trolley means is designated generally by the numeral 50 and comprises generally a bracket structure having opposed side walls 51 and 52 and a top wall 53. Chain 19 is provided with special link side plates 54 and a pin 55 pivotally connects side plates 54 with a plate member 56 which is incorporated in the bracket structure, and with the side wall structures of trolley 50. Plate 56 maintains lateral spacing between the trolley structure and chain 19 and an upwardly projecting lug 57 is provided on the bracket structure for supporting the receptacle engaging means.

The bracket structure rotatably supports a pair of flanged wheels 60 which track on the upper edges of channel 17 and a second pair of flanged wheels 62 which track along the lower edge portions of plate 49, all as clearly shown in Fig. 3. A transversely extending shaft or bar 63 extends through the upstanding lug members 57 of the trolley structures at opposite sides of the apparatus and may be removably retained therein as by cotter pins or the like.

Since the chains 19 and 20 are synchronously operated by the drive means, the cross shaft 63 is maintained in a transverse position at right angles to the longitudinal plane of the truck throughout its movements.

In the form illustrated in Figs. 1, 2 and 3 by way of example, a pair of arms 65 are provided for engagement between the trolley structures and the trunnions 44 of receptacles 42 or other article or material supports. Each arm has a bearing portion 66 at one end which is rotatably mounted on shaft 63 and is provided with a notch at its other end for engagement over trunnion 44 in the manner clearly illustrated in Fig. 1.

In the embodiment of the invention shown herein by way of example each arm 65 is provided with a laterally outwardly projecting stub shaft member 68 at its notched end. When arms of this type are employed the projecting shaft members 68, upon upward movement of an engaged receptacle or carrier from the full line position of Fig. 1 to the next succeeding dot-and-dash line position, the projecting shaft members engage the channels 17 and 18 and ride thereupon as shown in the several dot-and-dash line positions of Fig. 1, whereby the receptacle 42 is carried forwardly in a more or less elevated position with respect to platform 10.

In other forms and for other purposes the projecting shafts 68 may be omitted, in which case the weight of the receptacle 42 will cause the arms 65 to extend straight downwardly from their bearings 66 throughout their upward and forward movements with the trolley members. Obviously, in this latter case the receptacles will be carried forwardly in the truck body in a much lower position.

This latter method of handling is particularly adaptable where it is desired to actually load a number of receptacles 42 in the truck body, rather than merely to discharge the contents of the receptacle into the truck body, and the forward loading movement in this case may cause the receptacle to slide upon a skid or the like or any other form of support which will raise the receptacle sufficiently to permit disengagement of the arms 65 from the trunnions 44.

Referring again to the primary form shown in the drawings herein, means are provided for selectively emptying the contents of receptacles 42 at any desired point within the truck body. Such means comprises a windlass or winch shaft 70, best shown in Fig. 2, which extends transversely and is journaled at opposite sides in or adjacent to the sides of the truck body and is provided with a winding drum 71. A flexible chain or cable 72 is secured at one end to the winding drum 71 as shown at 73 in Fig. 2 and the other end of the chain or cable is attached to a bracket or lug 74 fixed to an upper portion of receptacle 42 as shown in Fig. 1.

Windlass shaft 70 is provided with a turning crank 76 and a detent ratchet mechanism 77 to selectively vary the effective length of chain or cable 72. It will be noted that receptacle 42 will be carried in a more or less upright position by the action of gravity thereon as it raises from the full line position of Fig. 1 and until chain 72 becomes taut, as in the middle dot-and-dash line position of Fig. 1.

Further forward movement of receptacle 42 causes the chain 72 to tip the receptacle, as clearly illustrated in the right-hand dot-and-dash showing of Fig. 1, to dump the contents into the forward part of the truck body. Obviously, the chain or cable may be wound upon drum 71 to varying degrees to reduce the initial slack in chain or cable 72 and produce emptying of the receptacle at points farther back in the truck body to load the same uniformly.

We claim:

1. Vehicle loading apparatus comprising a truck body having a pair of opposed longitudinally extending side walls, guide means extending about the perimeter of each side wall in a vertical plane, endless flexible members extending about said guide means, a collecting receptacle adapted to rest on the ground and having engaging means at its opposite sides, and releasable coacting engaging means carried by said endless members whereby movement of said endless members in one direction about said guide means lifts said receptacle and moves the same forwardly in said truck body, and adjustable means operable by forward movement of said receptacle for turning the same to dump the contents thereof at various selected points along said truck body.

2. Vehicle loading apparatus comprising a truck body having a pair of opposed longitudinally extending side walls, guide means extending about the perimeter of each side wall in a vertical plane, endless flexible members extending about said guide means, a collecting receptacle adapted to rest on the ground and having engaging means at its opposite sides, and releasable coacting engaging means carried by said endless members whereby movement of said endless members in one direction about said guide means lifts said receptacle and moves the same forwardly in said truck body, and cable means connected with said receptacle and an adjustable anchoring point at the rear of the vehicle whereby forward movement of the receptacle in the truck body tips the receptacle at a predetermined point to dump its contents.

3. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members, and cooperating means on said carriage members and said receptacle for selective attachment, whereby power operation of said flexible members moves said receptacle from a ground supported position at the rear of the truck body upwardly and forwardly in said truck body and vice versa.

4. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members, and arm means supported by said carriage members for swinging movement in vertical longitudinal planes, coacting means for selective attachment between the outer portions of said arm means and said receptacle, whereby power operation of said flexible members moves said receptacle from a ground supported position at the rear of the truck body upwardly and forwardly in said truck body and vice versa with said receptacle suspended from said carriage members by said arm means.

5. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members, and arm means supported by said carriage members for swinging movement in vertical longitudinal planes, coacting means for selective attachment between the outer portions of said arm means and said receptacle, whereby power operation of said flexible members moves said receptacle from a ground supported position at the rear of the truck body upwardly and forwardly in said truck body and vice versa with said receptacle suspended from said carriage members by said arm means, and adjustable means for tipping said receptacle at selected points along said truck body to empty the same therein.

6. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members, and arm means supported by said carriage members and depending therefrom for disengageable attachment with opposite sides of said receptacle, whereby power operation of said flexible members moves said receptacle from a ground supported position at the rear of the truck body upwardly and forwardly in said truck body and vice versa in a suspended position, and adjustable means for tipping said receptacle at selected points along said truck body to empty the same therein.

7. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and cooperating means on said carriage members and said receptacle for selective attachment, whereby power operation of said flexible members moves said receptacle from a ground supported position at the rear of the truck body upwardly and forwardly until said abutment members bear against outwardly directed surfaces of said guide means and said receptacle moves forwardly with said abutment members supported by said guide means.

8. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and cooperating means on said carriage members and said receptacle for selective attachment, whereby power operation of said flexible members moves said receptacle from a ground supported position at the rear of the truck body upwardly and forwardly until said abutment members bear against outwardly directed surfaces of said guide means and said receptacle moves forwardly with said abutment members supported by said guide means, and adjustable means operable by forward movement of said receptacle for tipping the same to empty the contents thereof.

9. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and cooperating means on said carriage members and said receptacle for selective attachment, whereby power operation of said flexible members moves said receptacle from a ground supported position at the rear of the truck body upwardly and forwardly until said abutment members bear against outwardly directed surfaces of said guide means and said receptacle moves forwardly with said abutment members supported by said guide means, and cable means connected with said receptacle and an adjustable anchoring point at the rear of said vehicle whereby forward movement of the receptacle tips the receptacle at a predetermined point to empty its contents.

10. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and arm means depending from said carriage members and attachable to said receptacle for suspending the same from said carriage members, whereby power operation of said flexible members in one direction moves said receptacle from a ground supported position at the rear of the truck body upwardly and forwardly until said abutment members bear against outwardly directed surfaces of said guide means and said receptacle is moved forwardly by said arm means with said receptacle supported by said guide means through said abutment members.

11. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and arm means depending from said carriage members and attachable to said receptacle for suspending the same from said carriage members, whereby power operation of said flexible members in one direction moves said receptacle from a ground supported position at the rear of the truck body upwardly and forwardly until said abutment members bear against outwardly directed surfaces of said guide means and said receptacle is moved forwardly by said arm means with said receptacle supported by said guide means through said abutment members, and adjustable means operable by forward movement of said receptacle for tipping the same to empty the contents thereof.

12. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and arm means depending from said carriage members and attachable to said receptacle for suspending the same from said carriage members, whereby power operation of said flexible members in one direction moves said receptacle from a ground supported position at the rear of the truck body upwardly and forwardly until said abutment members bear against outwardly directed surfaces of said guide means and said receptacle is moved forwardly by said arm means with said receptacle supported by said guide means through said abutment members, and cable means connected with said receptacle and an adjustable anchoring point at the rear of said vehicle whereby forward movement of the receptacle tips the receptacle at a predetermined point to empty its contents.

13. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and arm means extending from said carriage members and attachable to said receptacle, said arm means including pivot portions for freely suspending the receptacle from said carriage members, whereby power operation of said flexible members lifts said receptacle from a ground supported position at the rear of the truck body and moves the same upwardly and forwardly until said abutment members bear against outwardly directed surfaces of said guide means and said receptacle moves forwardly with said abutment members supported by said upper guide means.

14. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and arm means extending from said carriage members and attachable to said receptacle, said arm means including pivot portions for freely suspending the receptacle from said carriage members, whereby power operation of said flexible members lifts said receptacle from a ground supported position at the rear of the truck body and moves the same upwardly and forwardly until said abutment members bear against outwardly directed surfaces of said guide means and said receptacle moves forwardly with said abutment members supported by said upper guide means, and adjustable means operable by forward movement of said receptacle for tipping the same to empty the contents thereof.

15. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a receptacle adapted to fit between said side walls and said carriage members and having laterally projecting abutment members, and arm means extending from said carriage members and attachable to said receptacle, said arm means including pivot portions for freely suspending the receptacle from said carriage members, whereby power operation of said flexible members lifts said receptacle from a ground supported position at the rear of the truck body and moves the same upwardly and forwardly until said abutment members bear against outwardly directed surfaces of said guide means and said receptacle moves forwardly with said abutment members supported by said upper guide means, and cable means connected with said receptacle and an adjustable anchoring point at the rear of said vehicle whereby forward movement of the receptacle tips the receptacle at a predetermined point to empty its contents.

16. Vehicle loading apparatus comprising a truck body having a pair of opposed side walls, guide means extending along the upper and rear marginal edge portions of each of said side walls, flexible members extending continuously along said guide means, power means for selectively moving said flexible members synchronously in either direction along said guide means, transversely aligned carriage members attached to said flexible members, a transverse shaft supported at its ends by said carriage members, a receptacle adapted to fit between said side walls and said carriage members, and arm means pivotally supported by said cross shaft and detachably engageable with said receptacle for lifting said receptacle from a ground supported position at the rear of the truck body upwardly and forwardly in said truck body and vice versa.

References Cited in the file of this patent

UNITED STATES PATENTS

| | | |
|---|---|---|
| 1,052,096 | Schulze | Feb. 4, 1913 |
| 1,943,398 | Sargent | Jan. 16, 1934 |
| 1,945,533 | Lima | Feb. 6, 1934 |
| 2,470,340 | Cook et al. | May 17, 1949 |
| 2,565,792 | Wagner et al. | Aug. 28, 1951 |
| 2,573,193 | Goldsberry | Oct. 30, 1951 |
| 2,652,163 | Stickney | Sept. 15, 1953 |
| 2,703,227 | Hughes | Mar. 1, 1955 |
| 2,713,431 | Koehler | July 19, 1955 |

FOREIGN PATENTS

| | | |
|---|---|---|
| 404,061 | Italy | May 20, 1943 |
| 601,569 | Great Britain | May 7, 1948 |